US012675712B2

(12) United States Patent
Holloran et al.

(10) Patent No.: US 12,675,712 B2
(45) Date of Patent: Jul. 7, 2026

(54) IDENTITY GRAPHING FOR NETWORK GENOMES

(71) Applicant: Charter Communications Operating, LLC, St. Louis, MO (US)

(72) Inventors: Thomas J. Holloran, Castle Rock, CO (US); Derik B. Johnson, Erie, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 1085 days.

(21) Appl. No.: 17/370,729

(22) Filed: Jul. 8, 2021

(65) Prior Publication Data

US 2023/0012041 A1    Jan. 12, 2023

(51) Int. Cl.
*G06N 20/00*        (2019.01)
*G06N 5/04*         (2023.01)

(52) U.S. Cl.
CPC .............. *G06N 5/04* (2013.01); *G06N 20/00* (2019.01)

(58) Field of Classification Search
CPC .................................. G06N 5/04; G06N 20/00
See application file for complete search history.

(56) References Cited

U.S. PATENT DOCUMENTS

| 9,100,326 B1* | 8/2015 | Iliofotou | .................. | G06F 16/95 |
| 2013/0322504 A1* | 12/2013 | Asati | ...................... | H04B 10/27 |
| | | | | 375/224 |
| 2021/0314238 A1* | 10/2021 | Cioffi | .................. | H04L 41/5009 |

OTHER PUBLICATIONS

Van der Walt, Estee; "Identity Deception on Social Media Platforms"; 2018; University of Pretoria (Year: 2018).*
Wang, Zhe et al.; "Inferring occupant counts from Wi-Fi data in buildings through machine learning"; 2019; Building and Environment, vol. 158; pp. 281-294 (Year: 2019).*
Wang, Xu et al.; "IoTTracker: An Enhanced Engine for Discovering Internet-of-Things Devices"; 2019; 2019 IEEE 20th International Symposium on "A World of Wireless, Mobile and Multimedia Networks" (WoWMoM); pp. 1-9 (Year: 2019).*
Shima, Keiichi; "Length Matters: Clustering System Log Messages using Length of Words"; 2016; Arxiv; pp. 1-10 (Year: 2016).*
Del Testa, Davide et al.; "Estimating the number of receiving nodes in 802.11 networks via machine learning techniques"; 2016; 2016 IEEE GLOBECOM; 1-7 (Year: 2016).*

(Continued)

*Primary Examiner* — David Yi
*Assistant Examiner* — Ezra J Baker
(74) *Attorney, Agent, or Firm* — The Marbury Law Group, PLLC

(57)        ABSTRACT

Various embodiments include methods and devices for identity graphing of network genomes. Embodiments may include processing a node data set having unstructured node identifiers (IDs), determining potential node IDs from the node data set, determining node counts based on the potential node IDs, and classifying probabilities of accuracy of the node counts via a node count machine learning classifier model. Embodiments may further include classifying probabilities of accuracy of node IDs via a node ID machine learning classifier model. Embodiments may further include generating a data structure associating at least a first node ID of the classified node IDs with a network equipment ID. Embodiments may further include associating a classified probability accuracy of the first node ID with the first node ID.

29 Claims, 13 Drawing Sheets

(56)        References Cited

OTHER PUBLICATIONS

Donnet, Benoit et al.; "Internet Topology Discovery: A Survey"; 2007; IEEE Communications Surveys vol. 9 No. 4; 56-69 (Year: 2007).*

Abbass, Hussein; "Speeding Up Backpropagation Using Multiobjective Evolutionary Algorithms"; 2003; MIT Neural Computation; 2705-2726 (Year: 2000).*

Jain, Nitin et al.; "Balloon Plot"; May 2006; R News vol. 6/2; 35-38 (Year: 2006).*

Ding, Shifei et al.; "An optimizing BP neural network algorithm based on genetic algorithm"; 2011; Springer Science+Business Media; 153-162 (Year: 2011).*

Wikipedia; "Sensitivity and specifity"; 2021; Wikipedia; 1-14 (Year: 2021).*

* cited by examiner

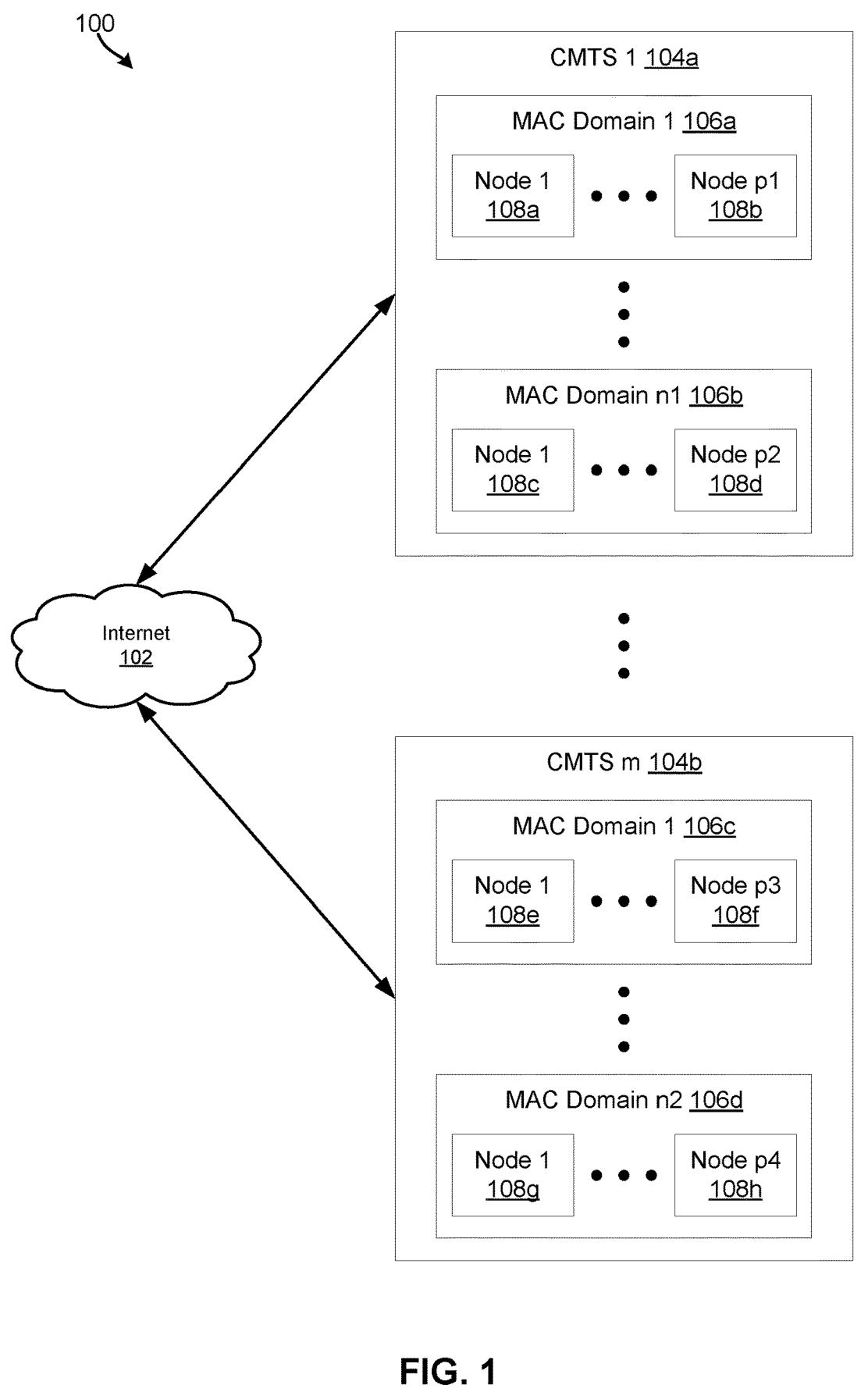

100

CMTS 1 104a

MAC Domain 1 106a

Node 1
108a

• • •

Node p1
108b

MAC Domain n1 106b

Node 1
108c

• • •

Node p2
108d

Internet
102

CMTS m 104b

MAC Domain 1 106c

Node 1
108e

• • •

Node p3
108f

MAC Domain n2 106d

Node 1
108g

• • •

Node p4
108h

FIG. 1

| CMTS | MAC Dom. | Node ID |
|------|----------|---------|
| CMTS 1 | MAC Dom. 1 | AV206; AV144;BL112; RC223b.2; OPEN/RC523 |
| CMTS 1 | MAC Dom. 2 | AV013; TestV1.1; AV144+AV625; BL167, h.2.3.7; BL450 AC323 |

300

| CMTS | MAC Dom. | Node ID |
|------|----------|---------|
| CMTS 1 | MAC Dom. 1 | NULL |
| CMTS 1 | MAC Dom. 2 | NULL |

302

| CMTS | MAC Dom. | Node ID |
|------|----------|---------|
| CMTS 1 | MAC Dom. 1 | |
| CMTS 1 | MAC Dom. 2 | |

304

400

| Char. Label | Node ID Char | Frequency |
|---|---|---|
| 0 | 0 | 125654 |
| 1 | 1 | 94065 |
| 2 | 2 | 67474 |
| 3 | ; | 60469 |
| 4 | 3 | 55044 |
| 5 | 4 | 46117 |
| 6 | A | 43402 |
| 7 | B | 41557 |
| 8 | 5 | 37456 |
| 9 | / | 36898 |
| 10 | 6 | 33258 |
| 11 | 7 | 29543 |
| 12 | S | 22485 |
| 13 | M | 21374 |
| 14 | 8 | 18847 |

•
•
•

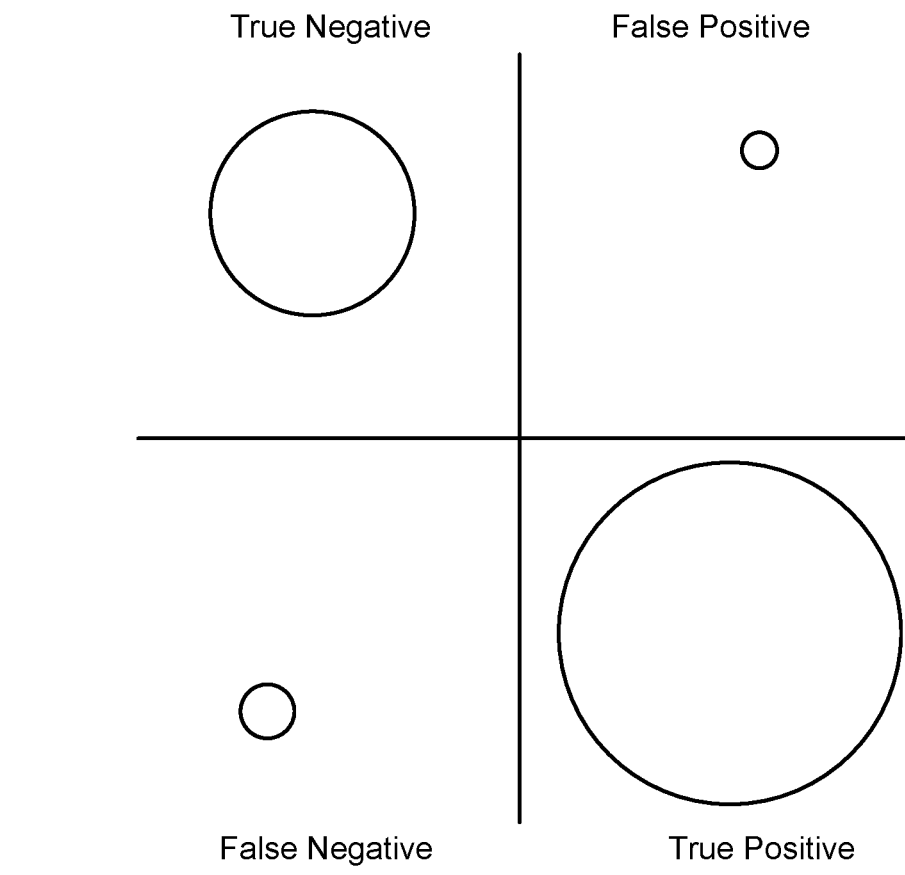
FIG. 6

700c

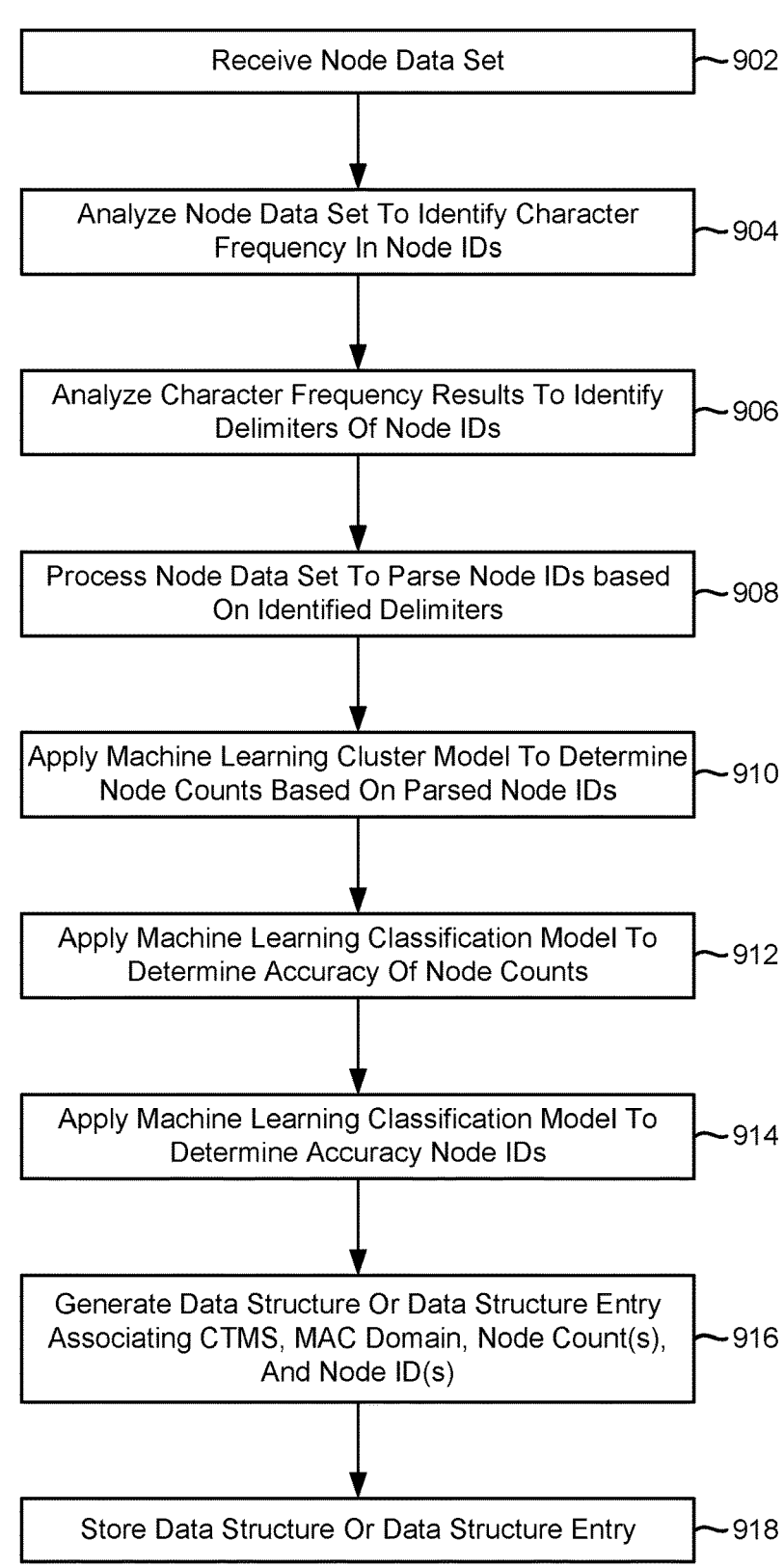

900

| Receive Node Data Set | ~902 |

| Analyze Node Data Set To Identify Character Frequency In Node IDs | ~904 |

| Analyze Character Frequency Results To Identify Delimiters Of Node IDs | ~906 |

| Process Node Data Set To Parse Node IDs based On Identified Delimiters | ~908 |

| Apply Machine Learning Cluster Model To Determine Node Counts Based On Parsed Node IDs | ~910 |

| Apply Machine Learning Classification Model To Determine Accuracy Of Node Counts | ~912 |

| Apply Machine Learning Classification Model To Determine Accuracy Node IDs | ~914 |

| Generate Data Structure Or Data Structure Entry Associating CTMS, MAC Domain, Node Count(s), And Node ID(s) | ~916 |

| Store Data Structure Or Data Structure Entry | ~918 |

FIG. 9

1000

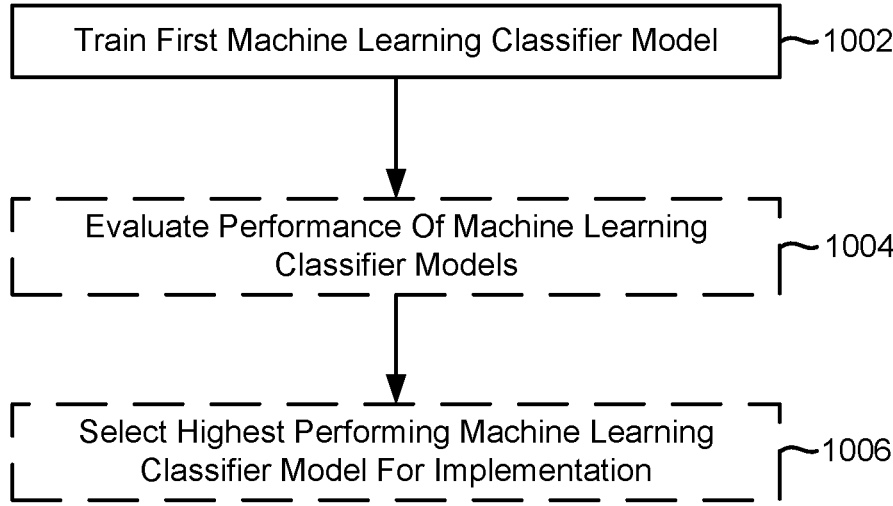

| Train First Machine Learning Classifier Model |— 1002

Evaluate Performance Of Machine Learning Classifier Models ⌐— 1004

Select Highest Performing Machine Learning Classifier Model For Implementation ⌐— 1006

FIG. 10

1100

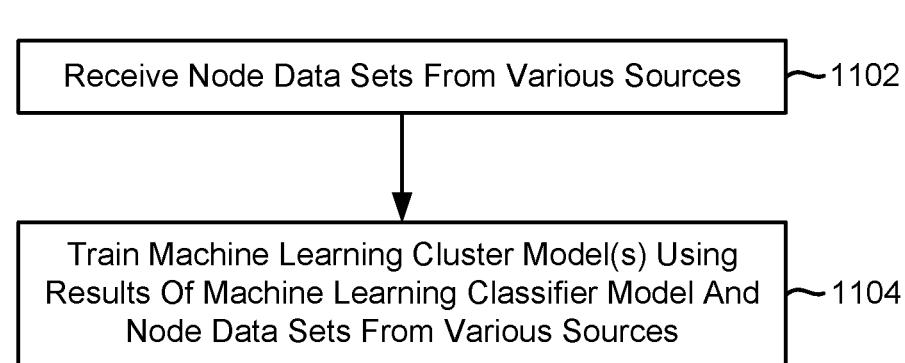

Receive Node Data Sets From Various Sources — 1102

Train Machine Learning Cluster Model(s) Using Results Of Machine Learning Classifier Model And Node Data Sets From Various Sources — 1104

FIG. 11

IDENTITY GRAPHING FOR NETWORK GENOMES

BACKGROUND

Cable modem internet networks have vast and complex structures, including diverse geographical placement and configuration of hardware components. For example, a cable modem internet network may include many geographically dispersed cable modem termination systems (CMTS) configured with different operational capacities, such as varying numbers of media accesses control (MAC) domains. CMTS and MAC domains may provide service to various nodes within the service area for the CMTS and MAC domains. However, nodes are difficult to identify due to various issues in cable modem internet network administration leading to node identification errors of duplication, mismapping, inconsistency, and misformatting.

SUMMARY

Various disclosed aspects may include apparatuses and methods for identity graphing of network genomes. Embodiments include processing a node data set having unstructured node identifiers (IDs), determining potential node IDs from the node data set, determining node counts based on the potential node IDs, and classifying probabilities of accuracy of the node counts via a node count machine learning classifier model.

Some embodiments may further include classifying probabilities of accuracy of node IDs via a node ID machine learning classifier model.

Some embodiments may further include generating a data structure associating at least a first node ID of the classified node IDs with a network equipment ID.

In some embodiments, generating the data structure may include associating a classified probability accuracy of the first node ID with the first node ID.

In some embodiments, generating the data structure may include associating a timestamp with the first node ID. Some embodiments may further include updating the data structure by associating at least a second node ID with the network equipment ID and a second timestamp.

In some embodiments, the network equipment ID may include a cable modem termination system ID and a media access control domain ID.

Some embodiments may further include scoring a quality of a node ID as selection for a node using a combination of Levenshtein string distance calculations and Vincenty or Haversine physical distance calculations applied to a geographic location descriptor associated with the node ID in the data structure.

Some embodiments may further include determining character counts characters of the unstructured node IDs, and determining potential delimiters of the unstructured node IDs, in which determining the potential node IDs from the node data set may include parsing the potential node IDs including consecutive characters between potential delimiters in the unstructured node IDs.

Some embodiments may further include generating clusters of the potential node IDs based on character length via a machine learning clustering model, in which labels of the clusters are associated with counts of potential node IDs based on character length, and in which determining the node counts based on the potential node IDs may include determining the node counts based on clusters of the potential node IDs.

Further aspects include a computing device having a processor configured with executable instructions to perform operations of any of the methods summarized above. Further aspects include a computing device having means for performing functions of any of the methods summarized above. Further aspects include a non-transitory processor-readable medium having stored thereon processor-executable instructions configured to cause a processor and other components of a computing device to perform operations of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

FIG. 1 is a component block diagram illustrating an example cable modem internet network suitable for implementing various embodiments.

FIG. 6 is a graph diagram illustrating an example of accuracy of a machine learning classifier model for node counts suitable for implementing various embodiments.

FIG. 9 is a process flow diagram illustrating a method for network genome identity graphing according to an embodiment.

FIG. 10 is a process flow diagram illustrating a method for training a machine learning classifier model according to an embodiment.

FIG. 11 is a process flow diagram illustrating a method for training a machine learning classifier model according to an embodiment.

DETAILED DESCRIPTION

Figure 2:
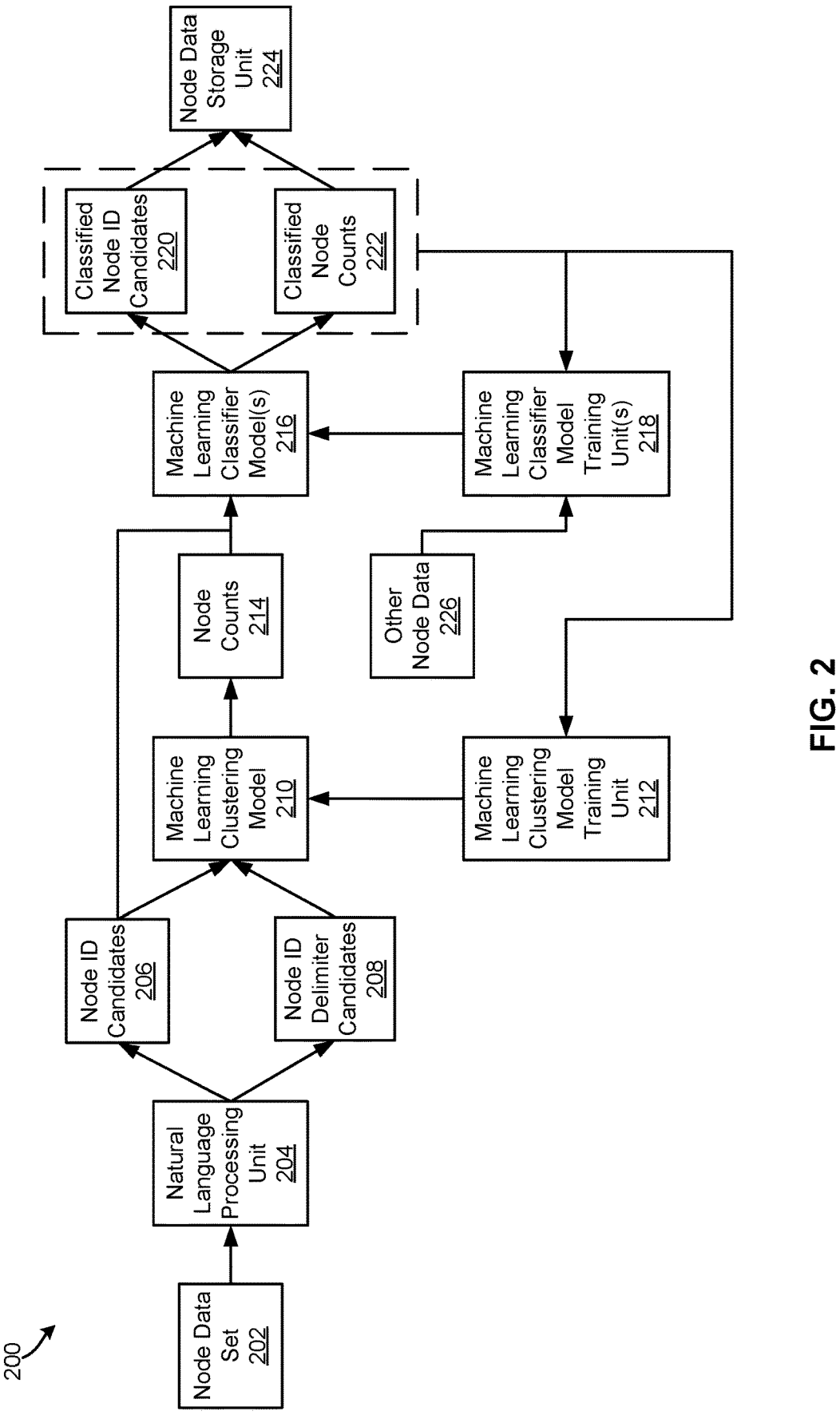
FIG. 2 is a component block and flow diagram illustrating an example network genome identity graphing system suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments may include methods, and computing devices implementing such methods for identity graphing for network genomes. The various embodiments may determine valid node identifiers (IDs) at cable modem termination system (CMTS) and media accesses control (MAC) domain levels of a cable modem internet network. The various embodiments, may determine node counts of the nodes at the CMTS and MAC domain levels based on the node IDs. The various embodiments may include determining probabilities of the accuracy of the determined node IDs. The various embodiments may include determining probabilities of the accuracy of the determined node counts. The various embodiments may include generating a data representation of a topography of the nodes of the cable modem internet network.

The term "computing device" may refer to stationary computing devices including personal computers, desktop computers, all-in-one computers, workstations, super computers, mainframe computers, embedded computers (such as in vehicles and other larger systems), servers, networked computers.

Cable modem internet network providers and administrators have a need to establish node counts and node IDs as granularly at CMTS and MAC domain levels. However, current approaches cannot overcome various issues in cable modem internet network administration resulting in node identification errors caused by duplication, mismapping, inconsistency, and misformatting of node identifiers. These various issues lead to inaccuracies in cable modem internet network administration that effect the accuracy of node counts and node ID identification.

Embodiments herein provide means for increasing accuracy of node counts and node ID identification by implementing multilevel data analysis and machine learning to identify potential node counts and node IDs and classify the likelihood accuracy node counts and suitability of node IDs at the CMTS and MAC domain level. Node IDs are commonly formatted as unstructured text, e.g., character strings without specific rules relating to character inclusion or exclusion, character order, length, etc., and may be entered manually by a user. Such manual entry may result in user error in entering a node ID. Moreover, node IDs may be assigned inconsistently. Still further as legacy nodes are acquired and integrated into a provider network, the node ID previously assigned may be inconsistent with the node IDs currently assigned to nodes.

Data analysis, such as natural language processing may be used on a data set of node IDs to identify patterns in data set and determine from the patterns the likely node IDs in the data set. For example, natural language processing may identify frequencies of individual characters and/or combinations of characters in the data set to determine delimiters that may indicate a terminal character for node IDs in the data set, valid node IDs, and/or invalid node IDs. Machine learning models may be implemented to cluster the data derived from the natural language processing to and derive likely node counts related to the node IDs. For example, clustering similarly structured node IDs may identify node counts based on most commonly used node ID structures. Further machine learning models may be implemented infer probabilities of the accuracy of the node counts and node IDs and classifying which of the node counts and node IDs are most likely accurate. A criterion based on the machine learning model classifications of node counts and node IDs may be used to generate a data structure associating select node IDs with a CMTS and MAC domain to provide a representation of a cable modem internet network's node topography.

FIG. 1 illustrates an example cable modem internet network 100 suitable for implementing various embodiments. Referring to FIG. 1, the cable modem internet network 100 may include any number and combination of CMTS 104a, 104b, such as any integer "m". A CMTS 104a, 104b may be configured to enable data communication, such as internet data and/or voice over internet protocol data, between the Internet 102 and other internet data equipment (not shown), such as a cable modem, configured to communicatively connect a computing device (not shown) to the Internet 102. In some embodiments, the CMTS 104a, 104b may be located at a cable modem internet service provider's (ISP) headend or hubsite. The CMTS 104a, 104b may enable customers of the cable modem internet ISP to communicate via the Internet 102 using a computing device. For example, the CMTS 104a, 104b may translate data between protocols used for communicating with the Internet 102 and with the other internet data equipment. Such protocols may differ, for example, based on the medium of communication between the CMTS 104a, 104b and the Internet 102 and between the CMTS 104a, 104b and the other internet data equipment.

The CMTS 104a, 104b may be configured with any number and combination of MAC domains 106a-106d, such as any integer "n", where "n1" and "n2" may be the same or different. A MAC domain 106a-106d may be configured to provide a logical communication point for data communication and functionality (e.g., Data Over Cable Service Interface Specification (DOCSIS) protocols, internet protocol (IP) connectivity, etc.) for implementing data communications between the CMTS 104a, 104b by the other internet data equipment.

The MAC domain 106a-106d may be assigned any number and combination of nodes 108a-108h, such as any integer "p", where any of "p1", "p2", "p3", and "p4" may be the same or different. A node 108a-108h may correspond to a group of cable modems that may be assigned for data communication with the CMTS 104a, 104b via the MAC domain 106a-106d. In some embodiments, the node 108a-108h may be defined in terms of any number and combination of geographic area, number of cable modems, supported hardware, supported software, supported communication protocols, amount of resources, service type, etc.

FIG. 1 illustrates a simplified example of a cable modem internet network for the sake of clarity and ease of explanation. One of skill in the art will realize that a cable modem internet network includes various other common components, not shown in FIG. 1, that enable number data communication between the Internet 102 and other internet data equipment, such as a cable modem. One of skill in the art will further realize that the various components, including the components illustrated and not illustrated in FIG. 1, may be differently organized, such as by combination and/or separation of the various components.

FIG. 2 illustrates an example network genome identity graphing system 200 suitable for implementing various embodiments. With reference to FIGS. 1 and 2, the network genome identity graphing system 200 may be implemented on a processor (e.g., a multicore processor, a central processing unit (CPU), graphics processing unit (GPU), intellectual property unit (IPU), accelerated processing unit (APU), field programmable gate array (FPGA), application specific integrated circuit (ASIC), etc.) configured with processor executable instructions to execute operations of the network genome identity graphing system 200, in software, on dedicated hardware, or any combination thereof.

The network genome identity graphing system 200 may receive a node data set 202, which may include information relating to identification of a node 108a-108h. The node data set 202 may include node identifiers (IDs) for any number and combination of nodes 108a-108h. For example, node data set 202 may include node IDs for one or more CMTS 104a, 104b and MAC domains 106a-106d. For another example, the node data set 202 may include the node IDs and one or more CMTS IDs and MAC domain IDs in a manner that associates the node IDs assigned to a CMTS 104a, 104b and a MAC domain 106a-106d.

The node data set 202 may be input to a natural language processing (NLP) unit 204, which may be configured to analyze the node data set 202. In some embodiments, the NLP unit 204 may be based on the Natural Language Toolkit (NLTK). The NLP unit 204 may be configured to identify characters in the node data set 202 relating to node IDs, including characters of node IDs and characters that are delimiters separating node IDs. The NLP unit 204 may be configured to identify a frequency, such as numerical count, of each character in the node data set 202 relating to node IDs. In some embodiments, the NLP unit 204 may be configured to identify characters that are delimiters separating node IDs based on a specified criterion. For example, the NLP unit 204 may be configured to identify specified characters as delimiters separating node IDs, such as punctuation characters, special characters, non-latin alphabet characters, non-arabic numeral characters, space characters, etc. For another example, the NLP unit 204 may be configured to identify specified characters in the node data set 202 having a frequency about a delimiter frequency threshold. Exceeding the delimiter frequency threshold may indicate to the NLP unit 204 that the identified characters are used frequently enough to be intentional and possibly a delimiter, rather than, for example, accidental or part of an uncommon node ID convention. The NLP unit 204 may generate and output node ID delimiter candidates 208. In some embodiments, the node ID delimiter candidates 208 may be organized in a manner in which a character identified as a delimiter separating node IDs is associated with the frequency of the character. In some embodiments, the node ID delimiter candidates 208 may be organized in a manner in which a character identified as a delimiter separating node IDs is further associated with a label.

The NLP unit 204 may use the identified delimiters to parse node ID candidates 206. The NLP unit 204 may parse strings of consecutive characters between the identified delimiters in the node data set 202 as node IDs to be included in the node ID candidates 206. In some embodiments, the NLP unit 204 may identify repeated node IDs, identify a frequency, such as numerical count, of the repeated node IDs, and generate the node ID candidates 206 in a manner that associates a single version of the node ID with the frequency of the node ID.

In some embodiments, the NLP unit 204 may be configured to identify and remove non-relevant data from the node data set 202. For example, the NLP unit 204 may be configured to identify specified patterns of characters, such as markup language and/or user notation.

A machine learning (ML) clustering model 210 may receive the node ID candidates 206 and/or the node ID delimiter candidates 208 as an input and generate node counts 214. In some embodiments, the ML clustering model 210 may use a K-means clustering algorithm. In some embodiments, the ML clustering model 210 may use unsupervised learning. The ML clustering model 210 may analyze the node ID candidates 206 and/or the node ID delimiter candidates 208 to determine patterns and statistical data relating to node IDs, and use the statistical determined information to generate clusters, such as a numerical counts, of similar node IDs. For example, the ML clustering model 210 may analyze the node ID candidates 206 to determine the character length of each node ID and generate a cluster of the node IDs for each character length. In some embodiments, the clusters may include various node IDs of various character lengths. For example, node IDs of a character length having a highest frequency may be concentrated in a first cluster, and may, in some embodiments, include node IDs of approximately the same character length, such as a standard deviation of approximately 1 to approximately 2 characters from a mean or median character length of the first cluster. For another example, node IDs of character lengths having a lowest frequency may be concentrated in a second cluster, and may, in some embodiments, include node IDs of a wide range of character lengths, such as standard deviation of approximately 7 characters from a mean or median character length of the second cluster. In some embodiments, each cluster may be associated with a cluster label and/or statistical data relating to the cluster, such as the numerical count of node IDs in the cluster, a mean or median character length of the node IDs in the cluster, a standard deviation of the character length of the node IDs in the cluster, a percentage of node IDs in the cluster have specific character lengths, etc. The node counts 214 may include any combination of the data generated by the ML clustering model 210, including, the numerical counts of the node IDs in each cluster. In some embodiments, the node counts 214 may include the numerical counts of the node IDs in each cluster in association with respective cluster labels. In some embodiments, the node counts 214 may include the numerical counts of the node IDs in each cluster in association with respective statistical data relating to the clusters.

One or more ML classifier model(s) 216 may receive the node ID candidates 206 and/or the node counts 214 as an input and generate classified node ID candidates 220 and classified node counts 222. In some embodiments, the ML classifier model(s) 216 may use supervised learning. A first ML classifier model 216 may analyze the node counts 214 and classify the probability that the number of nodes 108a-108h identified in the node counts 214 is accurate. In some embodiments, the first ML classifier model 216 may be a multi-label classifier model, such as a light gradient boosted trees classifier. The first ML classifier model 216 may use the labels and their associated cluster data, including the numerical counts of the node IDs in each cluster, and classify the accuracy of the number of nodes 108a-108h associated with each label. For example, the first ML classifier model 216 may classify the probability that the number of nodes 108a-108h identified in an individual labeled cluster is accurate. For another example, the first ML classifier model 216 may classify the probability that the total number of nodes 108a-108h identified in a set of labeled clusters, including all of the clusters, is accurate. The first ML classifier model 216 may generate and output the classified node counts 222 associating the classification of the probability that the number of nodes 108a-108h is accurate with the analyzed label and/or the associated cluster data. The classified probability of the accuracy of the number of nodes 108a-108h identified in the node counts 214 may be referred to a score of the accuracy of the number of nodes 108a-108h identified in the node counts 214. For example, a score may be associated with the number of nodes 108-108h for a label.

The first ML classifier model 216 may be trained by a first ML classifier model training unit 218. The first ML classifier model training unit 218 may be configured to train multiple multi-label classifiers and select a multi-label classifier achieving a specified performance metric, such as exceeding the performance metric of all of the other multi-label classifiers, as the first ML classifier model 216. The first ML classifier model training unit 218 may use data from various sources to train the first ML classifier model 216. For example, the first ML classifier model training unit 218 may use the classified node counts 222. In addition, the training first ML classifier model training unit 218 may use other node data 226, such as node counts, generated by means other than the ML clustering model 210, such as network management software, natural language processing, human generated data, etc.

For example, the first ML classifier model training unit 218 may use Automated Machine-Learning (AutoML) to train several different ML classifier models using different feature engineering techniques and grade each ML classifier models against a performance metric such as Root Mean Square Error (RMSE) and/or Area Under Curve (AUC). Based on the grades, a number of the different ML classifier models may be selected, such as the top 2 or 3 ML classifier models, for further evaluation using a Cross-Validation approach. The selected ML classifier models may be trained and evaluated on several random samples of the data and grade each selected ML classifier model against the performance metric. The top-performing, such as highest graded, ML classifier model may be validated, such as measuring the robustness of the ML classifier model's inferences, by introducing a Holdout set that ML classifier model hasn't encountered before.

A second ML classifier model 216 may analyze the node ID candidates 206 and classify the probability that a node ID in the node ID candidates 206 is accurate or valid for use. In some embodiments, the second ML classifier model 216 may analyze individual node IDs in the node candidates 206 node ID candidates 206 and classify the probability of the node ID being accurate. In some embodiments, the second ML classifier model 216 may analyze structures for the node IDs in the node ID candidates 206, such as length, character inclusion, character exclusion, character order, etc., and classify the probability of the node IDs having certain structures being accurate. In some embodiments, the second ML classifier model 216 may be configured to classify the probability of the node IDs for specific nodes 108a-108h, such as based on the classified node counts 222, including the cluster data. The second ML classifier model 216 may generate and output the classified node ID candidates 220 associating the classification of the probability that the node ID is accurate with the node ID. The classified probability of the accuracy of a node ID node ID candidates 220 may be referred to as a score of the accuracy of the node ID node in the ID candidates 220. For example, a score may be associated with the node ID in the node ID candidates 220.

The second ML classifier model 216 may be trained by a second ML classifier model training unit 218. The second ML classifier model training unit 218 may use data from various sources to train the second ML classifier model 216. For example, the second ML classifier model training unit 218 may use the classified node counts 222. In addition, the second ML classifier model training unit 218 may use other node data 226, such as node IDs, generated by means other than the NLP unit 204, such as network management software, human generated data, etc. In some embodiments, the second ML classifier model training unit 218 may use classified node counts 222, including the cluster data, to train the second ML classifier model 216 for node ID structures specific to certain nodes 108a-108h.

An ML clustering model training unit 212 may be configured to train the ML clustering model 210. The ML clustering model training unit 212 may use data from various sources to train the second ML clustering model 210. For example, the ML clustering model training unit 212 may use the classified node counts 222. The classification of the probability that a label, generated by the ML clustering model 210, is accurate in the classified node counts 222 may be used by the ML clustering model training unit 212 to improve the accuracy of the ML clustering model 210.

A node data storage unit 224 may store data of the classified node counts 222 and classified node ID candidates 220 in association. The node data storage unit 224 may generate or add data to a data structure associating node IDs with a CMTS ID and MAC domain ID to provide a representation of a cable modem internet network's node topography. In some embodiments, the node data storage unit 224 may associate other data with the node IDs, CMTS IDs, MAC domain IDs, such as geographic location descriptors (e.g., geographic location name, geographic coordinates, etc), timestamps, node counts, etc.

In some embodiments, the data of data structure may be used in various manner to improve the assignment of node IDs to nodes. The network genome identity graphing system 200 may be configured to retrieve and implement various operations using the data of data structure. For example, the network genome identity graphing system 200 generate an aggregate score for a CMTS ID, a MAC domain ID, and/or a geographic location descriptor, configured to indicate an amount of contention/ambiguity in the node IDs associated with the CMTS ID, the MAC domain ID, and/or the geographic location descriptor. The score may be a value derived from the probabilities that the node IDs are accurate. For example, the score may be a mean, median, etc., of the probabilities that the enode IDs are accurate for the node IDs associated with the CMTS ID, the MAC domain ID, and/or the geographic location descriptor. The score may be used to indicate CMTS IDs, the MAC domain IDs, and/or the geographic location descriptors for which node ID assignment may be improved.

For another example, the network genome identity graphing system 200 may generate a score a quality of a node ID selection for a node. The score may be based on distance calculations between various node IDs based on the geographic location descriptor associated with the node ID in the data structure. The distance calculations may include string similarity and physical distance calculations. For example, the score may be based on a combination of applying Levenshtein string distance calculations with Vincenty or Haversine physical distance calculations. The score may be used to determine a best available node ID for a node of a classified node count. For example, a first node having a first distance to a second node that is less than a second distance to a third node may be more likely to have node IDs similar to the node IDs of the second node than the further third node.

Figure 3:
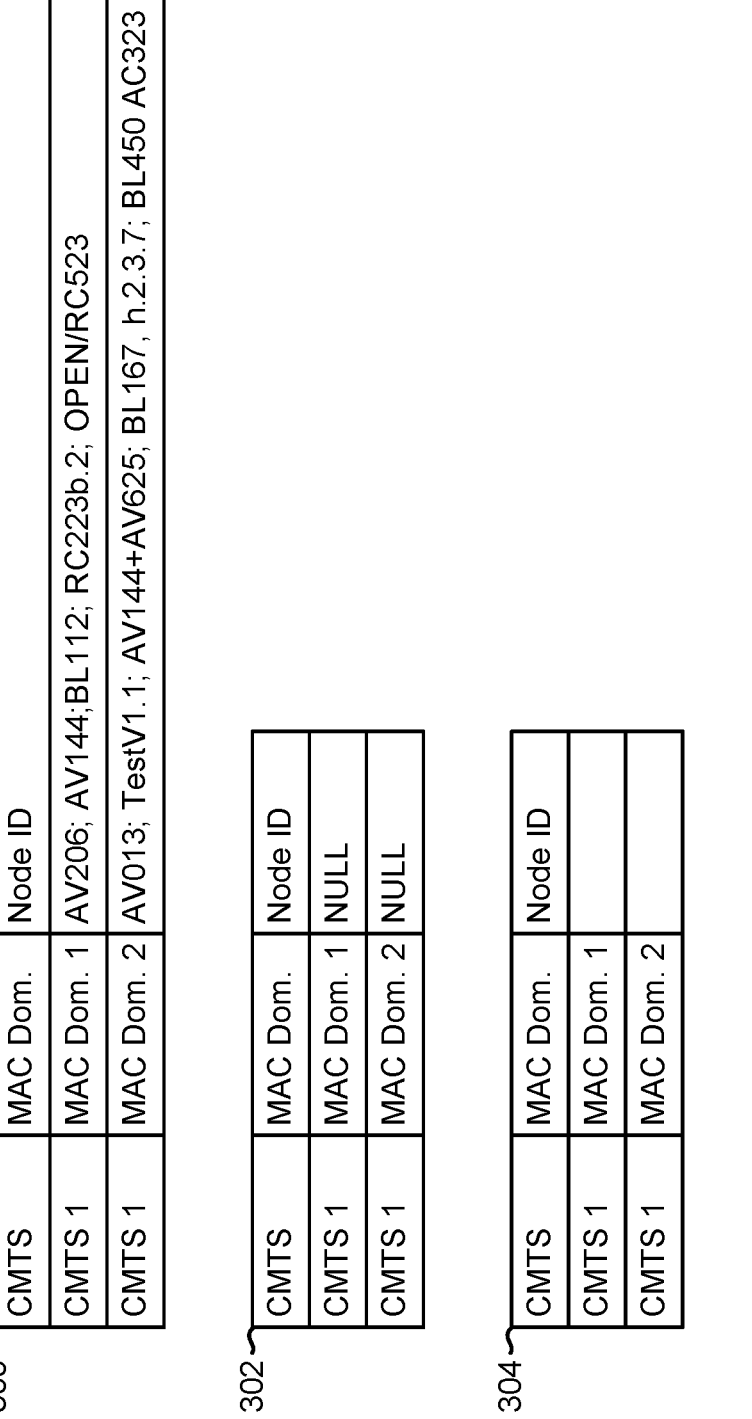
FIG. 3 is a chart diagram illustrating an example node data set at a granularity of a cable modem termination system (CMTS) and media accesses control (MAC) domain level suitable for implementing various embodiments.

FIG. 3 illustrates an example node data set 300, 302, 304 (e.g., node data set 202 in FIG. 2) at a granularity of a CMTS and MAC domain level suitable for implementing various embodiments. With reference to FIGS. 1-3, the node data sets 300, 302, 304 may originate from different sources and illustrate examples of the node identification errors in the node IDs for a CMTS 104a, 104b and MAC domain 106a-106d. For example, the node data set 300 includes various node IDs for each MAC domain (e.g., MAC domain 1 and MAC domain 2) of the CMTS 104a, 104b (e.g., CMTS 1), while node data sets 302, 304 do not include node IDs for the same CMTS and MAC domains. Further, between the node data sets 302, 304, the lack of node IDs is differently indicated by use of a "NULL" value in a node ID field in node data set 302 and a blank node ID field in node data set 304.

In the example illustrated in FIG. 3, the node ID field in node data set 300 includes node IDs exhibiting various node identification errors. For example, the node ID "AV206" is duplicated for both MAC domains. For another example, node IDs "RC223b.2", "OPEN", "TestV1.1", and "h.2.3.7" differ in structure from the other node IDs have a two letter and three number structure. For another example, node IDs "RC223b.2", "TestV1.1", and "h.2.3.7" include punctuation that may be generally used as delimiters between node IDs. For another example, "; [space]", ";[no space]", "/", "+", ",", and "[space]" are all used as delimiters between node IDs.

The foregoing node identification errors in the node data set 300, 302, 304 are examples of the node identification errors that may be identified by the NLP unit 204 from processing of the node data set 202 to generate the node ID candidates 206 and/or the node ID delimiter candidates 208.

Figure 4:
FIG. 4 is a chart diagram illustrating an example character frequency labeling data set suitable for implementing various embodiments.

FIG. 4 illustrates an example character frequency labeling data set 400 suitable for implementing various embodiments. With reference to FIGS. 1-4, the character frequency labeling data set 400 may be generated by the NLP unit 204 from processing of the node data set 202 to generate the node ID delimiter candidates 208. The character frequency labeling data set 400 may associate a character label (e.g., char. label), a node ID character, and a frequency. The character label may be a label for identifying the entry of the node ID character and the frequency. The node ID character may be a character from a node ID identified during processing of the node data set 202. The frequency may be a numerical count of a number of times the node ID character is identified in the node data set 202.

In some embodiments, the NLP unit 204 may analyze the character frequency labeling data set 400 to determine which of the node ID characters may be a delimiter for separating node IDs in the node ID data set 202. For example, the NLP unit 204 may be configured to identify specific characters from the character frequency labeling data set 400 as possible delimiters, such as punctuation characters, special characters, non-latin alphabet characters, non-arabic numeral characters, space characters, etc. For further example, a delimiter frequency threshold may be a specified value at or above which an identified possible delimiter may be determined. The NLP unit 204 may compare the frequency of the possible delimiter to the delimiter frequency threshold to determine whether the possible delimiter is a delimiter. The node ID delimiter candidates 208 may include entries character frequency labeling data set 400 for delimiters that have a frequency at or above the delimiter frequency threshold.

Figure 5:
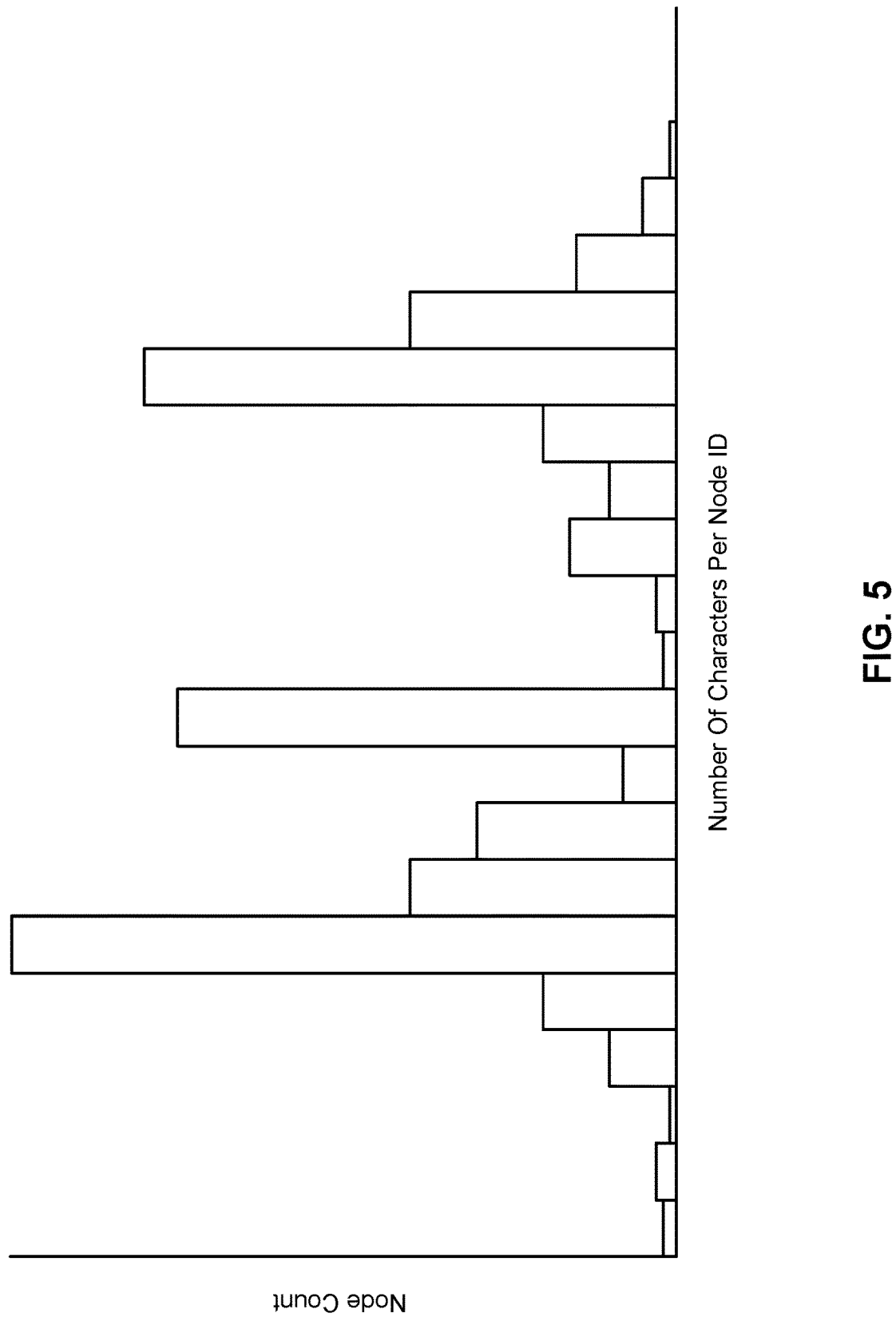
FIG. 5 is a graph diagram illustrating an example node ID clustering for identifying node counts suitable for implementing various embodiments.

FIG. 5 illustrates an example node ID clustering 500 for identifying node counts suitable for implementing various embodiments. With reference to FIGS. 1-5, the ML clustering model 210 may generate and output the node counts 214, which may be represented in an example graphical format in the node ID clustering 500. The node ID clustering 500 may plot a number of characters per node ID on the horizontal axis and frequency, such as numerical count, on the vertical axis. Values along both axes may increase moving away from the origin. The example node ID clustering 500 illustrates that certain node ID lengths, as measured by number of characters in a node ID, have a greater frequency, or are more common than, others. As such, the more common a node ID length is, the more likely a node ID of the node ID length is associated with a node 108a-108h. While less common than the most common node ID lengths may also be associated with a node 108a-108h using a less common naming convention, increasingly less common node ID lengths are increasingly less likely to be associated with a node 108a-108h. For example, a node ID with a less common node ID length may be a placeholder, a typographical error, an artifact from a previous node ID, etc. Each plot of the node ID clustering 500 may correspond to a with a label associated with a numerical count of the node IDs in a cluster.

FIG. 6 illustrates an example of accuracy of a machine learning classifier model 216 for node counts suitable for implementing various embodiments. The machine learning classifier model 216 may classify probabilities of the accuracy of node counts, generating classified node counts 222. Some classifications may correctly classify node counts as likely correct or likely incorrect, and some classifications may incorrectly classify node counts as likely correct or likely incorrect. With reference to FIGS. 1-6, a quadrant plot 600 of an example of accuracy of a machine learning classifier model 216 for node counts may plot machine learning classifier model classification of node counts on a horizontal axis and accumulated node count data on a vertical axis. An upper left quadrant may correspond with identifying true negative nodes, or correctly classifying node counts as likely incorrect. An upper right quadrant may correspond with identifying false positive nodes, or incorrectly classifying node counts as likely correct. A lower left quadrant may correspond with identifying false negative nodes, or incorrectly classifying node counts as likely incorrect. A lower right quadrant may correspond with identifying true positive nodes, or correctly classifying node counts as likely correct. Circles on the quadrant plot 600 may represent a proportional number of classifications with respect to each of the quadrants. Larger circles in the quadrants for true negatives and true positives may indicate a higher value for accuracy than larger circles in the quadrants for false negatives and false positives. Through training and implementing the machine learning classifier model 216, the machine learning classifier model 216 may improve classification of the node counts to achieve higher accuracy classifications, classifying increasingly more true negatives and true positives than false negatives and false positives.

Figure 7A:
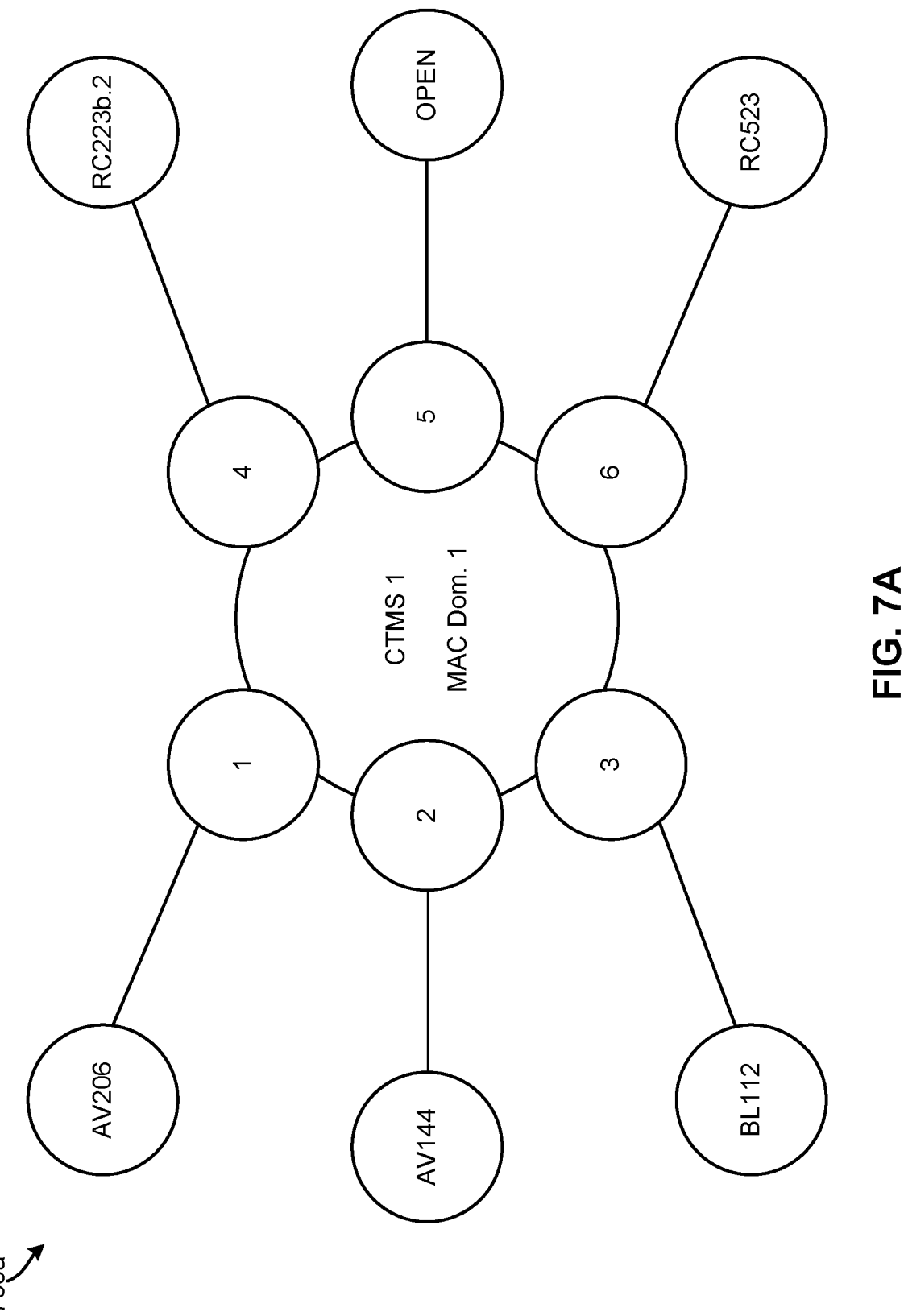
FIGS. 7A-7C are graph diagrams illustrating an example of a data structure associating CMTS, MAC domain, node IDs, and node counts suitable for implementing various embodiments.
Figure 7B:
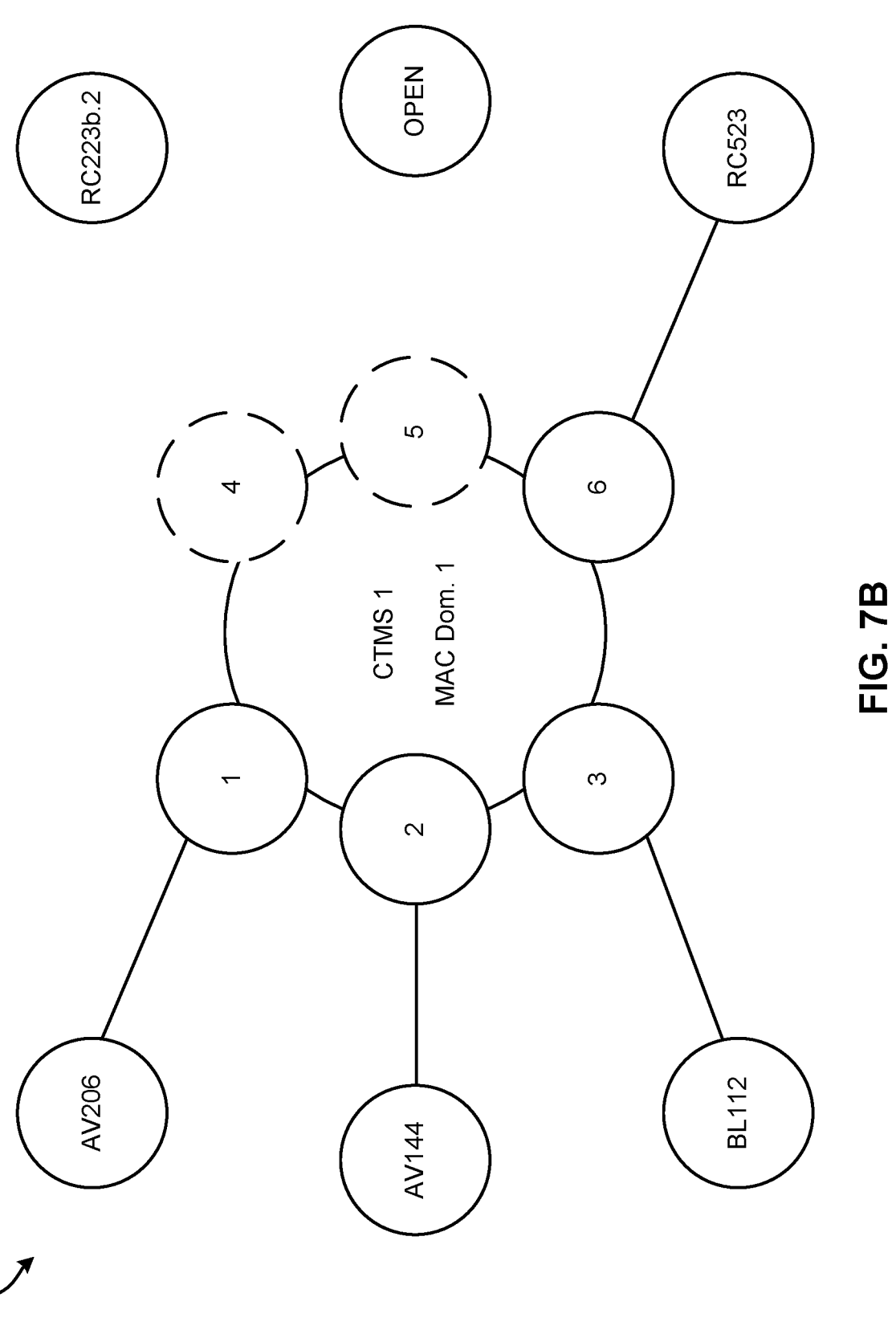
Figure 7C:
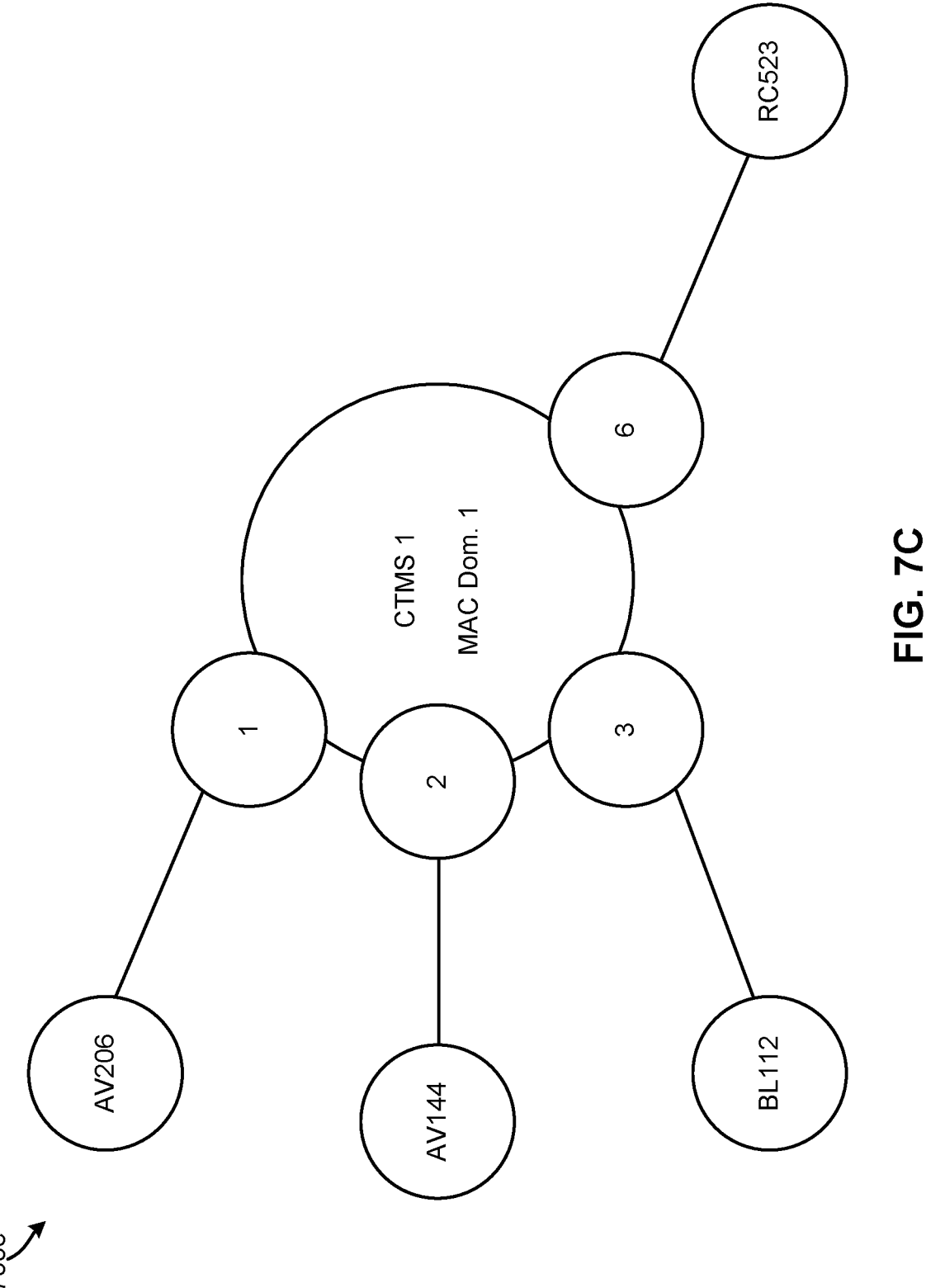

FIGS. 7A-7C illustrate an example of a data structure 700a-700c associating CMTS, MAC domain, node IDs, and node counts suitable for implementing various embodiments. With reference to FIGS. 1-7C, the data structure 700a-700c may be a format used by the network genome identity graphing system 200. The data structure 700a, illustrated in FIG. 7A may represent data from the node data set 202. The data structure 700b may represent the data from the node data set 202 as it is evaluated by the network genome identity graphing system 200. The data structure 700c may represent the data structure generated and stored by the node data storage unit 224. In the examples illustrated in FIGS. 7A-7C, the data structure 700a-700c may include data for nodes 108a-108h of a CMTS and MAC domain (e.g., CMTS 1, MAC Dom. 1).

In the example illustrated in FIG. 7A, the data structure 700a may include data for six nodes (e.g., 1-6) associated with the CMTS and MAC domain. Each node may be associated with a node ID (e.g., node 1: AV206, node 2: AV144, node 3: BL112, node 4: RC223b.2, node 5: OPEN, node 6: RC523). The network genome identity graphing system 200, such as the second ML classifier model 216, may generate the data structure 700b based on the classified node ID candidates 220, removing unlikely node IDs for corresponding unlikely nodes (e.g., node 4: RC223b.2, node 5: OPEN). The resulting data structure 700c may be generated and stored by the node data storage unit 224, including likely node IDs for corresponding likely nodes (e.g., node 1: AV206, node 2: AV144, node 3: BL112, node 6: RC523) in association with the CMTS and MAC domain.

Figure 8:
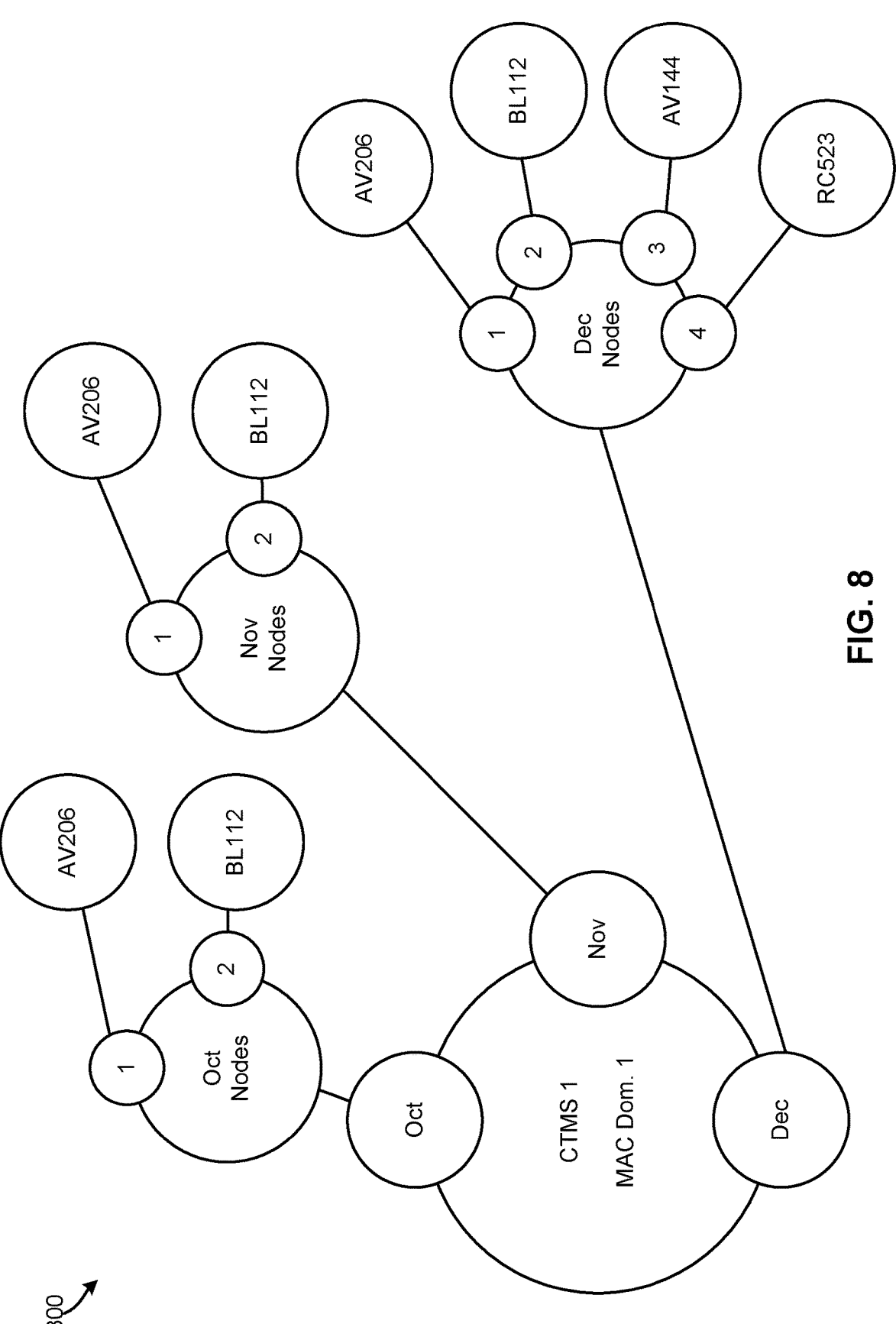
FIG. 8 is a graph diagram illustrating an example of a data structure associating CMTS, MAC domain, node IDs, and node counts suitable for implementing various embodiments.

FIG. 8 illustrate an example of a data structure 800 associating CMTS, MAC domain, node IDs, and node counts suitable for implementing various embodiments. With reference to FIGS. 1-7C, the data structure 800 may be a format used by the network genome identity graphing system 200. The data structure 800 may be generated and/or updated and stored by the node data storage unit 224. The data structure 800 may represent the node IDs and node counts associated with a CMTS and MAC domain (e.g., CMTS 1, MAC Dom. 1) over time. In the example illustrated in FIG. 8, the data structure 800 may include node IDs and node counts at different times, such as in different months of a year (e.g., Oct Nodes, Nov Nodes, Dec Nodes). In October, two nodes (e.g., node 1: AV206, node 2: BL112) may be associated with CMTS 1, MAC Dom. 1. In November, no change in the data structure 800 may represent no changes in the node IDs and node counts associated with CMTS 1, MAC Dom. 1. In December, four nodes (e.g., node 1: AV206, node 2: BL112, node 3: AV144, node 4: RC523) may be associated with CMTS 1, MAC Dom. 1, represent an addition of two nodes from the previous month, November.

The data structure 800, may be extended to any number and combination of nodes, MAC domains, and CMTS of a cable mode internet network and provide a topology of each of such elements of the cable mode internet network. In some embodiments, the classified probabilities of the accuracy of the node counts and/or the node IDs, or scores, may be included in the data structure 800 in association with the nodes. The data structure 800 may be queried to generate node counts and lists of node IDs at various points in time. The data structure 800 may enable tracking changes in the topology of the cable mode internet network over time. Features included in the data structure 800 many enable running aggregate meta-calculations across generations and components of the cable mode internet network topology. Further machine learning models may be applied to probabilistically assign node IDs to nodes without node IDs, such as new nodes, based on the scores of the accuracy of the node IDs already assigned to nodes of a same CMTS and/or MAC domain.

FIG. 9 illustrates a method 900 for node genome identity graphing according to an embodiment. With reference to FIGS. 1-9, the method 900 may be implemented in a computing device, in general purpose hardware, in dedicated hardware, in software executing in a processor, or in a combination of a software-configured processor and dedicated hardware. For example, the method 900 may be implemented as a processor executing software within network genome identity graphing system 200 that includes other individual components, and various memory/cache controllers. In order to encompass the alternative configurations enabled in various embodiments, the hardware implementing the method 900 is referred to herein as an "processing device."

In block 902, the processing device may receive a node data set (e.g., node data set 202, which may include information relating to identification of a node 108a-108h. The node data set 202 may include node identifiers (IDs) for any number and combination of nodes 108a-108h. For example, the node data set 202 may include node IDs and one or more CMTS IDs and MAC domain IDs in a manner that associates the node IDs assigned to a CMTS 104a, 104b and a MAC domain 106a-106d.

In block 904, the processing device may analyze the node data set 202 to identify character frequency in node IDs. The processing device may be configured to identify characters in the node data set 202 relating to node IDs, including characters of node IDs and characters that are delimiters separating node IDs. The processing device may be configured to identify a frequency, such as numerical count, of each character in the node data set 202 relating to node IDs. In some embodiments, the processing device analyzing the node data set 202 to identify character frequency in node IDs in block 904 may implement an NLP unit 204.

In block 906, the processing device may analyze the character frequency results (e.g., character frequency labeling data set 400) to identify delimiters of node IDs. In some embodiments, the processing device may be configured to identify characters that are delimiters separating node IDs based on a specified criterion. For example, the processing device may be configured to identify specified characters as delimiters separating node IDs, such as punctuation characters, special characters, non-latin alphabet characters, non-arabic numeral characters, space characters, etc. For another example, the processing device may be configured to identify specified characters in the node data set 202 having a frequency about a delimiter frequency threshold. Exceeding the delimiter frequency threshold may indicate to the processing device that the identified characters possibly delimiters. The processing device may generate and output node ID delimiter candidates 208. In some embodiments, the node ID delimiter candidates 208 may be organized in a manner in which a character identified as a delimiter separating node IDs is associated with the frequency of the character. In some embodiments, the node ID delimiter candidates 208 may be organized in a manner in which a character identified as a delimiter separating node IDs is further associated with a label. In some embodiments, the processing device analyzing the character frequency results to identify delimiters of node IDs in block 906 may implement the NLP unit 204.

In block 908, the processing device may process the node data set 202 to parse node IDs based on identified delimiters. The processing device may use the identified delimiters to parse node ID candidates 206. The processing device may parse strings of consecutive characters between the identified delimiters in the node data set 202 as node IDs to be included in the node ID candidates 206. In some embodiments, the processing device may identify repeated node IDs, identify a frequency, such as numerical count, of the repeated node IDs, and generate the node ID candidates 206 in a manner that associates a single version of the node ID with the frequency of the node ID. In some embodiments, the processing device may be configured to identify and remove non-relevant data from the node data set 202. For example, the processing device may be configured to identify specified patterns of characters, such as markup language and/or user notation. In some embodiments, the processing device processing the node data set 202 to parse node IDs based on identified delimiters in block 908 may implement the NLP unit 204.

In block 910, the processing device may apply an ML cluster model 210 to determine node counts 214 based on parsed node IDs. The processing device applying the ML clustering model 210 may analyze the node ID candidates 206 and/or the node ID delimiter candidates 208 to determine patterns and statistical data relating to node IDs, and use the statistical determined information to generate clusters, such as a numerical counts, of similar node IDs. For example, the processing device applying the ML clustering model 210 may analyze the node ID candidates 206 to determine the character length of each node ID and generate a cluster of the node IDs for each character length. In some embodiments, the clusters may include various node IDs of various character lengths. For example, node IDs of a mean or median character length may be concentrated in a first cluster, and may include node IDs a standard deviation of characters from the mean or median character length of the cluster. In some embodiments, each cluster may be associated with a cluster label and/or statistical data relating to the cluster, such as the numerical count of node IDs in the cluster, a mean or median character length of the node IDs in the cluster, a standard deviation of the character length of the node IDs in the cluster, a percentage of node IDs in the cluster have specific character lengths, etc. The node counts 214 may include any combination of the data generated by the ML clustering model 210, including, the numerical counts of the node IDs in each cluster. In some embodiments, the node counts 214 may include the numerical counts of the node IDs in each cluster in association with respective cluster labels. In some embodiments, the node counts 214 may include the numerical counts of the node IDs in each cluster in association with respective statistical data relating to the clusters.

In block 912, the processing device may apply an ML classification model 216 to determine accuracy of the node counts 214. The processing device applying a first ML classifier model 216 may analyze the node counts 214 and classify the probability that the number of nodes 108a-108h identified in the node counts 214 is accurate. The processing device applying the first ML classifier model 216 may use the labels and their associated cluster data, including the numerical counts of the node IDs in each cluster, and classify the accuracy of the number of nodes 108a-108h associated with each label. The processing device applying the first ML classifier model 216 may generate and output the classified node counts 222 associating the classification of the probability that the number of nodes 108a-108h is accurate with the analyzed label and/or the associated cluster data.

In block 914, the processing device may apply an ML classification model 216 to determine accuracy of the node IDs. The processing device applying a second ML classifier model 216 may analyze the node ID candidates 206 and classify the probability that a node ID in the probability node ID candidates 206 is accurate or valid for use. In some embodiments, the processing device applying the second ML classifier model 216 may analyze individual node IDs in the node candidates 206 node ID candidates 206 and classify the probability of the node ID being accurate. In some embodiments, the processing device applying the second ML classifier model 216 may analyze structures for the node IDs in the node ID candidates 206, such as length, character inclusion, character exclusion, character order, etc., and classify the probability of the node IDs having certain structures being accurate. In some embodiments, the processing device applying the second ML classifier model 216 may be configured to classify the probability of the node IDs for specific nodes 108a-108h, such as based on the classified node counts 222, including the cluster data. The processing device applying the second ML classifier model 216 may generate and output the classified node ID candidates 220 associating the classification of the probability that the node ID is accurate with the node ID.

In block 916, the processing device may generate a data structure (e.g., data structure 700a-700c, 800) or data structure entry associating CMTS, MAC domain, node count(s), and node ID(s). The processing device may generate or add data to a data structure associating node IDs with a CMTS ID and MAC domain ID to provide a representation of a cable modem internet network's node topography. In some embodiments, the processing device may associate other data with the node IDs, CMTS IDs, MAC domain IDs, such as geographic location descriptors (e.g., geographic location name, geographic coordinates, etc), timestamps, node counts, etc. In some embodiments, the processing device generating the data structure or data structure entry associating CMTS, MAC domain, node count(s), and node ID(s) in block 916 may implement a node data storage unit 224.

In block 918, the processing device may store the data structure or data structure entry. In some embodiments, the processing device may store the data structure as or the data structure entry to a database. In some embodiments, the processing device storing the data structure or data structure entry in block 918 may implement the node data storage unit 224.

FIG. 10 is a process flow diagram illustrating a method for training a machine learning classifier models according to an embodiment. With reference to FIGS. 1-10, the method 1000 may be implemented in a computing device, in general purpose hardware, in dedicated hardware, in software executing in a processor, or in a combination of a software-configured processor and dedicated hardware. For example, the method 1000 may be implemented as a processor executing software within network genome identity graphing system 200 that includes other individual components, and various memory/cache controllers. In order to encompass the alternative configurations enabled in various embodiments, the hardware implementing the method 1000 is referred to herein as an "processing device."

In block 1002, the processing device may train the first ML classifier model 216. The processing device may be configured to train multiple multi-label classifiers. The processing device may use data from various sources to train the first ML classifier model 216. For example, the processing device may use the classified node counts 222. In addition, the processing device may use other node data 226, such as node counts, generated by means other than the ML clustering model 210, such as network management software, natural language processing, human generated data, etc. In some embodiments, the processing device training the first ML classifier model 216 in block 1002 may implement a first ML classifier model training unit 218.

In optional block 1004, the processing device may evaluate performance of the trained ML classifier models. The processing device may evaluate which trained ML classifier models achieve a specified performance metric, such as exceeding the same performance metric of the all other trained ML classifier models. For example, the performance metric may include RMSE and/or AUC. In some embodiments, the processing device evaluating performance of the trained ML classifier models in block 1004 may implement a ML classifier model training unit 218.

In optional block 1006, the processing may select a highest performing ML classifier model for implementation.

The processing device may select the ML classifier model achieving the specified performance metric, such as exceeding the performance metric of all of the other trained ML classifier models, as the first ML classifier model 216. In some embodiments, the processing device selecting a highest performing ML classifier model for implementation in block 1006 may implement the ML classifier model training unit 218.

FIG. 11 is a process flow diagram illustrating a method for training a machine learning classifier models according to an embodiment. With reference to FIGS. 1-11, the method 1100 may be implemented in a computing device, in general purpose hardware, in dedicated hardware, in software executing in a processor, or in a combination of a software-configured processor and dedicated hardware. For example, the method 1100 may be implemented as a processor executing software within network genome identity graphing system 200 that includes other individual components, and various memory/cache controllers. In order to encompass the alternative configurations enabled in various embodiments, the hardware implementing the method 1100 is referred to herein as an "processing device."

In block 1102, the processing device may receive node data sets from various sources. In some embodiments, the processing device may train the second ML classifier model 216 using other node data 226, such as node IDs, generated by means other than the NPL unit 204, such as network management software, human generated data, etc. In some embodiments, the processing device receiving the node data sets from the various sources in block 1102 may implement a ML classifier model training unit 218.

In block 1104, the processing device may train the second ML classifier model 216 using results of the second ML classifier model 216 and node data sets from various sources. The processing device may train the second ML classifier model 216 using the results of prior implementations of the second ML classifier model 216, such as the classified node counts 222, including the cluster data, to train the second ML classifier model 216 for node ID structures specific to certain nodes 108a-108h. The processing device may train the second ML classifier model 216 using the other node data 226 received in block 1102. In some embodiments, the processing device training the second ML classifier model 216 using results of the second ML classifier model 216 and node data sets from various sources in block 1104 may implement the ML classifier model training unit 218.

Figure 12:
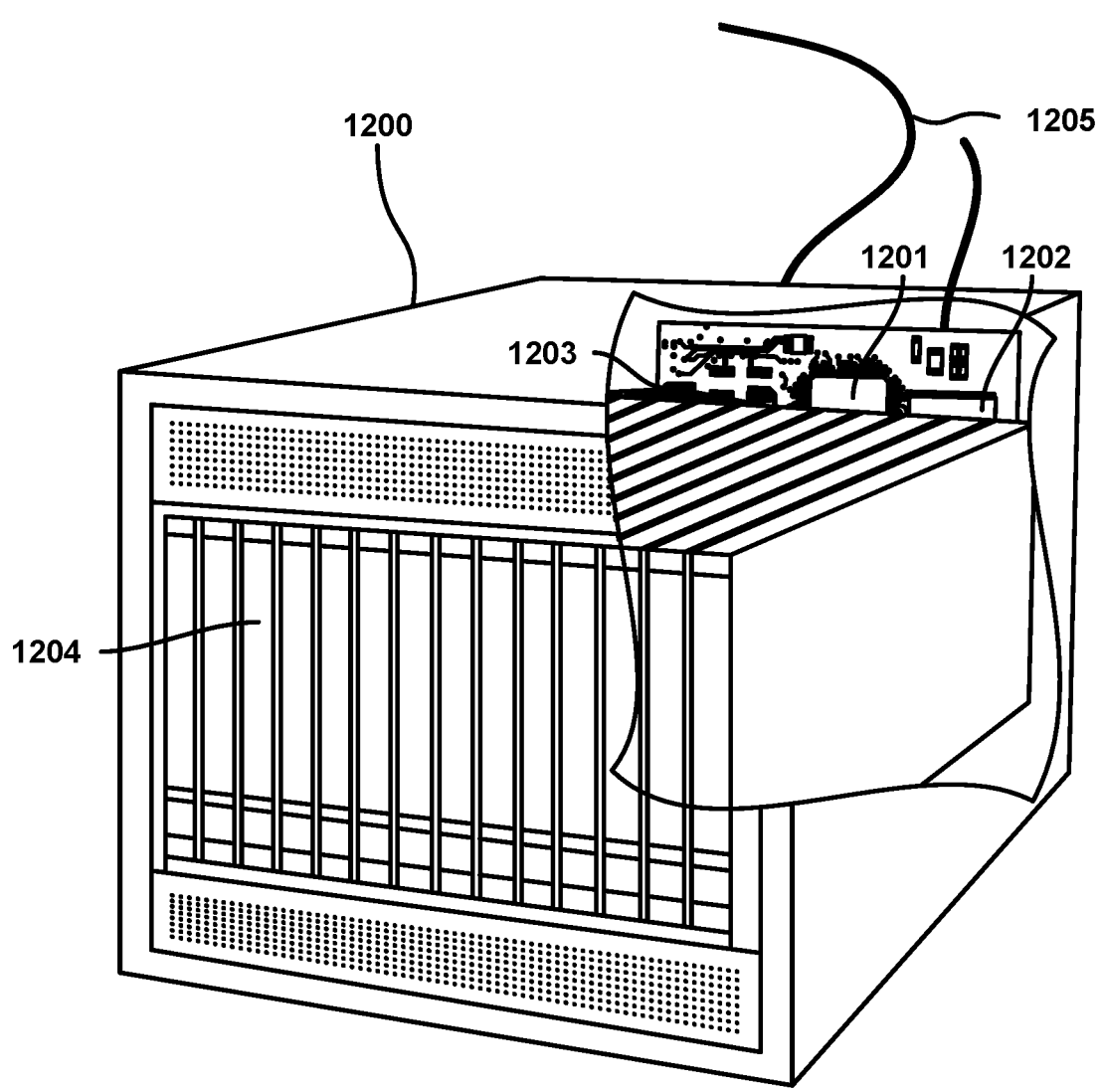
FIG. 12 is a component block diagram illustrating an example server suitable for implementing various embodiments.

Methods and devices for implementing such methods in accordance with the various embodiments (including, but not limited to, embodiments described above with reference to FIGS. 1-11) may also be implemented in fixed computing systems, such as any of a variety of commercially available servers. An example server 1200 is illustrated in FIG. 12. Such a server 1200 typically includes one or more multicore processor assemblies 1201 coupled to volatile memory 1202 and a large capacity nonvolatile memory 1204, such as a disk drive or solid-state drive. As illustrated in FIG. 12, multicore processor assemblies 1201 may be added to the server 1200 by inserting them into the racks of the assembly. The server 1200 may also include network access ports 1203 coupled to the multicore processor assemblies 1201 for establishing network interface connections with a network 1205, such as a local area network coupled to other broadcast system computers and servers, the Internet, the public switched telephone network, and/or a cellular data network (e.g., CDMA, TDMA, GSM, PCS, 3G, 4G, 5G, LTE, or any other type of cellular data network).

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The processors discussed in this application may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the device and memory within the processors themselves. Additionally, as used herein, any reference to a memory may be a reference to a memory storage and the terms may be used interchangeable.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method for identity graphing of network genomes of an internet network by a processor of a computing device, comprising:

receiving, from a cable modem internet network, a node data set having unstructured node identifiers (IDs) for nodes of the internet network, the node data set further including cable modem termination systems (CMTS) IDs and media access control (MAC) domain IDs, wherein the CMTS IDs are associated with both the MAC domain IDs and the node IDs, wherein the unstructured node IDs include character strings that contain node identification errors of at least one of duplication, mismapping, inconsistency, or misformatting;

determining potential node IDs from the node data set;

determining node counts based on the potential node IDs;

classifying probabilities of accuracy of the node counts via a node count machine learning classifier model, wherein the machine learning classifier model is trained through a multi-stage process comprising:

training multiple candidate classifier models;

grading each candidate model against a performance metric that comprises at least one of Area Under Curve (AUC) or Root Mean Square Error (RMSE);

selecting a subset of the candidate models based on the grading for further evaluation using cross-validation;

selecting a highest-performing candidate model from the subset based on the performance metric; and validating the highest-performing candidate on holdout data not previously encountered by the model as the node count machine learning classifier model; and generating a representation of a topography of the internet network based on the probabilities of accuracy of the node counts, wherein the representation associates each node ID with a corresponding CMTS ID and a MAC domain ID, and wherein generating the representation includes removing node IDs from the node data set based on the classified probabilities of accuracy to correct the node identification errors.

2. The method of claim 1, further comprising classifying probabilities of accuracy of node IDs via a node ID machine learning classifier model, wherein generating the representation of the topography of the internet network based on the probabilities of accuracy of the node counts further comprises generating the representation of the topography of the internet network based on the probabilities of the node IDs.

3. The method of claim 2, wherein generating the representation of the topography of the internet network based on the probabilities of accuracy of the node counts and the probabilities of the accuracy of node IDs comprises generating a data structure associating at least a first node ID of the node IDs for which the probabilities of accuracy of the node IDs are classified with a network equipment ID.

4. The method of claim 3, wherein generating the data structure comprises associating a classified probability accuracy of the first node ID with the first node ID.

5. The method of claim 3, wherein generating the data structure comprises associating a timestamp with the first node ID, the method further comprising updating the data structure by associating at least a second node ID with the network equipment ID and a second timestamp.

6. The method of claim 3, wherein the network equipment ID comprises a cable modem termination system ID and a media access control domain ID.

7. The method of claim 2, further comprising scoring a quality of a node ID as selection for a node using a combination of Levenshtein string distance calculations and Vincenty or Haversine physical distance calculations applied to a geographic location descriptor associated with the node ID in the data structure.

8. The method of claim 1, further comprising:

determining character counts of characters of the unstructured node IDs; and determining potential delimiters of the unstructured node IDs, wherein determining the potential node IDs from the node data set comprises parsing the potential node IDs comprising consecutive characters between potential delimiters in the unstructured node IDs.

9. The method of claim 1, further comprising generating clusters of the potential node IDs based on character length via a machine learning clustering model, wherein labels of the clusters are associated with counts of potential node IDs based on character length, and wherein determining the node counts based on the potential node IDs comprises determining the node counts based on clusters of the potential node IDs.

10. A computing device, comprising a processor configured with executable instructions configured to cause the processor to perform operations comprising:

receiving, from a cable modem internet network, a node data set having unstructured node identifiers (IDs) for nodes of an internet network, the node data set further including cable modem termination system (CMTS) IDs and media access control (MAC) domain IDs, wherein the CMTS IDs are associated with both the MAC domain IDs and the node IDs, wherein the unstructured node IDs include character strings that contain node identification errors of at least one of duplication, mismapping, inconsistency, or misformatting;

determining potential node IDs from the node data set;

determining node counts based on the potential node IDs;

classifying probabilities of accuracy of the node counts via a node count machine learning classifier model, wherein the node count machine learning classifier model is trained through a multi-stage process comprising:

training multiple candidate classifier models;

grading each candidate model against a performance metric that comprises at least one of Area Under Curve (AUC) or Root Mean Square Error (RMSE);

selecting a subset of the candidate models based on the grading for further evaluation using cross-validation;

selecting a highest-performing candidate model from the subset based on the performance metric; and validating the highest-performing candidate on holdout data not previously encountered by the model as the node count machine learning classifier model; and generating a representation of a topography of the internet network based on the probabilities of accuracy of the node counts, wherein the representation associates each node ID with a corresponding CMTS ID and MAC domain ID, and wherein generating the representation includes removing node IDs from the node data set based on the classified probabilities of accuracy to correct the node identification errors.

11. The computing device of claim 10, wherein the processor is configured with executable instructions configured to cause the processor to perform operations further comprising classifying probabilities of accuracy of node IDs via a node ID machine learning classifier model, wherein generating the representation of the topography of the internet network based on the probabilities of accuracy of the node counts further comprises generating the representation of the topography of the internet network based on the probabilities of accuracy of the node IDs.

12. The computing device of claim 11, wherein the processor is configured with executable instructions configured to cause the processor to perform operations such that generating the representation of the topography of the internet network based on the probabilities of accuracy of the node counts and the probabilities of the accuracy of node IDs comprises generating a data structure associating at least a first node ID of the node IDs for which the probabilities of the accuracy of the node IDs are classified with a network equipment ID.

13. The computing device of claim 12, wherein the processor is configured with executable instructions configured to cause the processor to perform operations such that generating the data structure comprises associating a classified probability accuracy of the first node ID with the first node ID.

14. The computing device of claim 12, wherein:

the processor is configured with executable instructions configured to cause the processor to perform operations such that generating the data structure comprises associating a timestamp with the first node ID; and the processor is configured with executable instructions configured to cause the processor to perform operations further comprising updating the data structure by associating at least a second node ID with the network equipment ID and a second timestamp.

15. The computing device of claim 12, wherein the processor is configured with executable instructions configured to cause the processor to perform operations such that the network equipment ID comprises a cable modem termination system ID and a media access control domain ID.

16. The computing device of claim 11, wherein the processor is configured with executable instructions configured to cause the processor to perform operations further comprising scoring a quality of a node ID as selection for a node using a combination of Levenshtein string distance calculations and Vincenty or Haversine physical distance calculations applied to a geographic location descriptor associated with the node ID in the data structure.

17. The computing device of claim 10, wherein the processor is configured with executable instructions configured to cause the processor to perform operations further comprising:

determining character counts of characters of the unstructured node IDs; and determining potential delimiters of the unstructured node IDs, wherein determining the potential node IDs from the node data set comprises parsing the potential node IDs comprising consecutive characters between potential delimiters in the unstructured node IDs.

18. The computing device of claim 10, wherein the processor is configured with executable instructions configured to cause the processor to perform operations further comprising generating clusters of the potential node IDs based on character length via a machine learning clustering model wherein labels of the clusters are associated with counts of potential node IDs based on character length, wherein determining the node counts based on the potential node IDs comprises determining the node counts based on clusters of the potential node IDs.

19. A non-transitory processor-readable medium having stored thereon processor-executable instructions configured to cause a processing device to perform operations comprising:

receiving, from a cable modem internet network, a node data set having unstructured node identifiers (IDs) for nodes of an internet network, the node data set further including cable modem termination system (CMTS) IDs and media access control (MAC) domain IDs, wherein the CMTS IDs are associated with both the MAC domain IDs and the node IDs, wherein the unstructured node IDs include character strings that contain node identification errors of at least one of duplication, mismapping, inconsistency, or misformatting;

determining potential node IDs from the node data set;

determining node counts based on the potential node IDs;

classifying probabilities of accuracy of the node counts via a node count machine learning classifier model, wherein the machine learning classifier model is trained using network management software data and human-generated node data through a multi-stage process comprising:

training multiple candidate classifier models;

grading each candidate model against a performance metric that comprises at least one of Area Under Curve (AUC) or Root Mean Square Error (RMSE);

selecting a subset of the candidate models based on the grading for further evaluation using cross-validation;

selecting a highest-performing candidate model from the subset based on the performance metric; and validating the highest-performing candidate on holdout data not previously encountered by the model as the node count machine learning classifier model; and generating a representation of a topography of the internet network based on the probabilities of accuracy of the node counts, wherein the representation associates each node ID with a corresponding CMTS ID and MAC domain ID, and wherein generating the representation includes removing node IDs from the node data set based on the classified probabilities of accuracy to correct the node identification errors.

20. The non-transitory processor-readable medium of claim 19, wherein the stored processor-executable instructions are configured to cause the processing device to perform operations further comprising classifying probabilities of accuracy of node IDs via a node ID machine learning classifier model, wherein generating the representation of the topography of the internet network based on the probabilities of accuracy of the node counts further comprises generating the representation of the topography of the internet network based on the probabilities of accuracy of the node IDs.

21. The non-transitory processor-readable medium of claim 20, wherein the stored processor-executable instructions are configured to cause the processing device to perform operations such that generating the representation of the topography of the internet network based on the probabilities of accuracy of the node counts and the probabilities of accuracy of the node IDs comprises generating a data structure associating at least a first node ID of the node IDs for which the probabilities of the accuracy of the node IDs are classified with a network equipment ID.

22. The non-transitory processor-readable medium of claim 21, wherein the stored processor-executable instructions are configured to cause the processing device to perform operations such that generating the data structure comprises associating a classified probability accuracy of the first node ID with the first node ID.

23. The non-transitory processor-readable medium of claim 21, wherein:

the stored processor-executable instructions are configured to cause the processing device to perform operations such that generating the data structure comprises associating a timestamp with the first node ID; and the stored processor-executable instructions are configured to cause the processing device to perform operations further comprising updating the data structure by associating at least a second node ID with the network equipment ID and a second timestamp.

24. The non-transitory processor-readable medium of claim 21, wherein the stored processor-executable instructions are configured to cause the processing device to perform operations such that the network equipment ID comprises a cable modem termination system ID and a media access control domain ID.

25. The non-transitory processor-readable medium of claim 20, wherein the stored processor-executable instructions are configured to cause the processing device to perform operations further comprising scoring a quality of a node ID as selection for a node using a combination of Levenshtein string distance calculations and Vincenty or Haversine physical distance calculations applied to a geographic location descriptor associated with the node ID in the data structure.

26. The non-transitory processor-readable medium of claim 19, wherein the stored processor-executable instructions are configured to cause the processing device to perform operations further comprising:

determining character counts of characters of the unstructured node IDs; and determining potential delimiters of the unstructured node IDs, wherein determining the potential node IDs from the node data set comprises parsing the potential node IDs comprising consecutive characters between potential delimiters in the unstructured node IDs.

27. The non-transitory processor-readable medium of claim 19, wherein the stored processor-executable instructions are configured to cause the processing device to perform operations further comprising generating clusters of the potential node IDs based on character length via a machine learning clustering model wherein labels of the clusters are associated with counts of potential node IDs based on character length, wherein determining the node counts based on the potential node IDs comprises determining the node counts based on clusters of the potential node IDs.

28. The method of claim 1, wherein the node count machine learning classifier model maps the potential node IDs into groups corresponding to true positives, true negatives, false positives, and false negatives, and determines proportional indicators of the classifications in each group, and the proportional indicators of the true positive and true negative groups increase relative to the false positive group and the false negative group.

29. The method of claim 28, wherein the node count machine learning classifier model represents the classifications in a quadrant mapping, in which a first quadrant corresponds to true negatives, a second quadrant corresponds to false positives, a third quadrant corresponds to false negatives, a fourth quadrant corresponds to true positives, and wherein proportional indicators of the classifications in each quadrant are represented as circles, larger circles indicating a greater number of classifications in that quadrant and smaller circles indicating a lesser number of classifications.

* * * * *